United States Patent [19]
Iwasaki

[11] Patent Number: 5,923,420
[45] Date of Patent: Jul. 13, 1999

[54] OPTICAL SPECTRUM CALCULATING METHOD

[75] Inventor: Takashi Iwasaki, Tokyo, Japan

[73] Assignee: Ando Electric Co., Ltd., Tokyo, Japan

[21] Appl. No.: 09/087,197

[22] Filed: May 29, 1998

[30] Foreign Application Priority Data

May 30, 1997 [JP] Japan .................................. 9-142765

[51] Int. Cl.$^6$ ........................................... G01J 3/42
[52] U.S. Cl. ........................................ 356/319; 356/332
[58] Field of Search .................................. 356/326, 328, 356/332, 334, 308

[56] References Cited

U.S. PATENT DOCUMENTS

| | | | |
|---|---|---|---|
| 4,560,275 | 12/1985 | Goetz | 356/326 |
| 4,669,880 | 6/1987 | Nelson et al. | 356/326 |
| 5,218,553 | 6/1993 | De Loos-Vollebregt et al. | 364/498 |
| 5,473,427 | 12/1995 | Riley et al. | 356/328 |
| 5,742,525 | 4/1998 | Ye | 364/571 |
| 5,771,094 | 6/1998 | Carter et al. | 356/326 |

*Primary Examiner*—Frank G. Font
*Assistant Examiner*—Tu T. Nguyen

*Attorney, Agent, or Firm*—Fish & Richardson P.C.

[57] ABSTRACT

The object of the present invention it to provide an optical spectrum calculation method that can find an optical spectrum by an arbitrarily determined wavelength bandwidth even in a spectrometer in which the width of the emission slit cannot be arbitrarily changed.

In order to attain this objective, a wavelength bandwidth memory unit 40 is provided, and in this wavelength bandwidth memory unit 40, the characteristics of the transiting wavelength bandwidth for the measured wavelength of spectrometer 5' are recorded. CPU 34 finds the wavelength bandwidth for each measurement point based on the recorded wavelength bandwidth. Next, the optical intensity values for each measurement point are calculated from the optical intensity measurement value for each measurement point the measurement values near the center of said measurement value regiondded over the range of the desired wavelength bandwidth, and further, compensated based on the ratio between the wavelength bandwidth for each measurement point and the wavelength interval of each measurement point.

6 Claims, 6 Drawing Sheets

OPTICAL SPECTRUM CALCULATING METHOD

BACKGROUND OF THE INVENTION

1. Field of the Invention

The present invention relates to an optical spectrum calculation method using an optical spectrum measurement apparatus which measures the optical spectrum characteristics of a light source.

2. Background Art

An optical spectrum measurement apparatus is used to analyze the wavelength components included in light.

Generally, an optical spectrum measurement apparatus is provided with an input slit for adjusting the amount of incident light, a diffraction grating for spatially separating light input from the input slit, and an output slit which extracts only particular wavelengths in the light separated by the diffraction grating.

The width of the above-mentioned input slit and emission slit can be changed by being manipulated by the operator.

The width of the output slit determines the wavelength bandwidth of the emitted light, and from the point of view of the precision of measurement, a narrow width is preferable.

However, in adjusting the slit width while making a measurement, much manual work and time are necessary in the manipulation, and the effectiveness of the measurements deteriorates.

SUMMARY OF THE INVENTION

The object of the present invention in consideration of the above-mentioned defects is to provide an optical spectrum calculating method which can find the optical spectrum in an arbitrarily given bandwidth even in a spectroscope in which the emission slit cannot be arbitrarily adjusted.

In addition, it is the object of the present invention to provide an optical spectrum calculation method which can correctly calculate the optical spectrum for any arbitrarily given bandwidth even when the wavelength bandwidth and the measured wavelength interval are different.

In addition, it is the object of the present invention to provide an optical spectrum calculation method which can correctly calculate the optical spectrum for any arbitrarily given wavelength bandwidth even when the wavelength bandwidth of the spectroscope changes depending on the measured wavelength.

In order to realize these objectives, the optical spectrum calculation method of the present invention includes setting the measurement interval of the measurement points of the optical spectrum and a predetermined wavelength bandwidth, measuring the optical intensity of the light input at each of said set measurement points, setting the wavelength region determined by said measurement interval and said wavelength bandwidth at the short wavelength and long wavelength side for each of said measurement points, and obtaining the optical intensity values of each of said measurement points by adding the optical intensities over the relevant wavelength region for the measured optical intensities.

In addition, the present invention in some embodiments, includes compensating said optical intensity value according to the optical intensity of the measurement points closest to the relevant shortest wavelength component which is outside said wavelength region in the shortest wavelength component and the degree of closeness to the measurement point to which the shortest wavelength component is closest, and according to the optical intensity of the measurement points closest to the relevant longest wavelength component which is outside said wavelength region in the longest wavelength component and the degree of closeness to the relevant measurement point to which the longest wavelength component is closest, when said wavelength regions of the shortest wavelength component and the longest component are between said measurement point and another measurement point.

In addition, the present invention can include the acts of setting the measurement interval of the measurement points of the optical spectrum and a predetermined wavelength bandwidth, setting the optical intensity of the light input at each of said set measurement points by the spectrometer, setting the wavelength region determined by said measurement interval at the short wavelength and long wavelength side for each of said measurement points and said wavelength bandwidth, and obtaining the optical intensity values of each of said measurement points by adding the optical intensities over the relevant wavelength region for the measured optical intensities, and compensating the measured optical intensities based on the ratio between the wavelength bandwidth and said wavelength interval when the wavelength region of said spectrometer is treated as constant.

In addition, the present invention can include compensating said optical intensity value according to the optical intensity of the measurement points closest to the relevant shortest wavelength component which is outside said wavelength region in the shortest wavelength component, the degree of closeness to the measurement point to which the shortest wavelength component is closest, and the ratio between the wavelength region and said wavelength interval when the wavelength bandwidth of said spectrometer is treated as constant, and according to the optical intensity of the measurement points closest to the longest wavelength component which is outside said wavelength region at the longest wavelength component, the degree of closeness to the relevant measurement point to which the longest wavelength component is closest, and the ratio between the wavelength region and said wavelength interval when the wavelength bandwidth of said spectrometer is treated as constant, when said wavelength regions of the shortest wavelength component and the longest component are between said measurement point and another measurement point.

In addition, the present invention can include the acts of setting the wavelength bandwidth of the spectrometer for the measured wavelength, setting the measurement interval of the spectrometer, measuring the optical intensity input for each of said set measurement points by said spectrometer, and for each of said measurement points found from said wavelength bandwidth in which the wavelength bandwidth of said spectrometer was set for each of said measurement points of the optical spectrum, setting the wavelength area determined by said measurement interval on the short wavelength and long wavelength side and said wavelength bandwidth, obtaining the optical intensity of each of said measurement points by adding the optical intensities over the relevant wavelength region for the measured optical intensities, and compensating the optical intensities of each of said measurement points based on the ratio of said wavelength bandwidth and said wavelength interval.

In addition, the present invention can include the acts of compensating said optical intensity value in compensating said optical intensity value according to the optical intensity of the measurement points closest to the relevant shortest wavelength component which is outside said wavelength region in the shortest wavelength component, the degree of closeness to the measurement point to which the shortest wavelength component is closest, and the ratio between the wavelength bandwidth and said wavelength interval on the relevant closest measurement points, and according to the optical intensity of the measurement points closest to the longest wavelength component, the degree of closeness to the relevant measurement point to which the longest wavelength component is closest which is outside said wavelength region at the longest wavelength component, and the ratio between the wavelength bandwidth and said wavelength interval on the relevant closest measurement points, when said wavelength regions of the shortest wavelength component and the longest component are between said measurement point and measurement point Because of summing the optical intensity measurement values of each measuring point of the measured optical spectrum in the longitudinal direction, the present invention has the effect of being above to find the optical spectrum by an arbitrary wavelength bandwidth even when the width of the emission slit of the spectrograph cannot be arbitrarily set.

In addition, by compensating the dynamically added optical intensity by the ratio between the wavelength bandwidth of the spectroscope and the measured wave interval, the present invention can correctly find the optical spectrum for any arbitrary wavelength bandwidth.

Furthermore, the present invention has the effect of being able to record in advance the resolution bandwidth for each wavelength of the spectroscope, and correctly find the optical spectrum for any arbitrary wavelength bandwidth even when the wavelength bandwidth of the spectroscope changes depending on the measured wavelength by applying the ratio between the wavelength bandwidth of the spectroscope and the measurement wavelength interval for the measurement wavelength to the dynamically added optical intensity.

DETAILED DESCRIPTION OF THE PREFERRED EMBODIMENTS

Before explaining the present invention, first the optical spectrum measuring apparatus related to the present invention will be explained.

Figure 5:
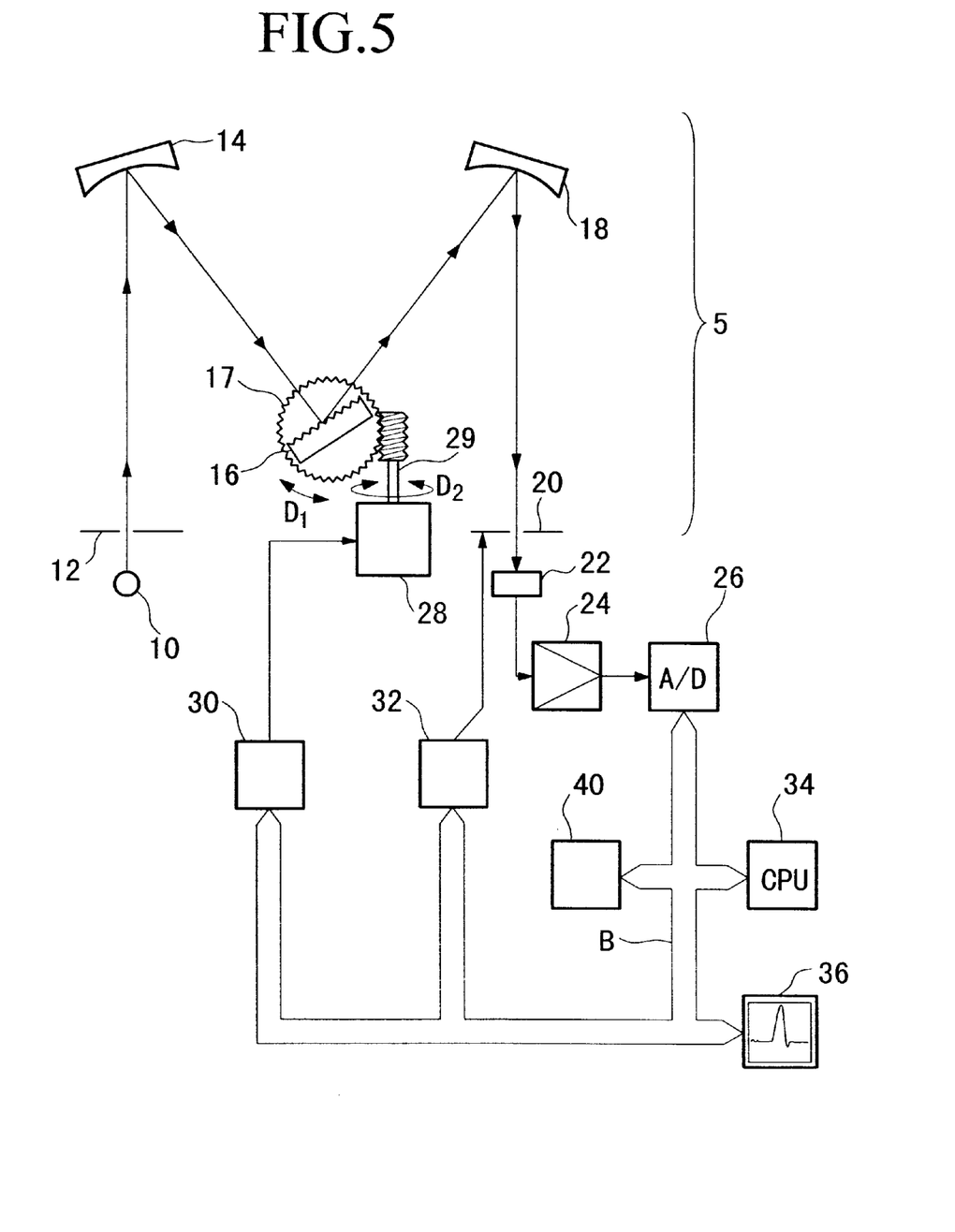
FIG. 5 is a block diagram showing the construction of the optical spectrum measurement apparatus related to the present invention.

FIG. 5 is a block diagram of the construction of the optical spectrum measuring apparatus associated with out invention. In FIG. 5, reference numeral 10 is a light source which includes various wavelength components, and emits light which is the object of the spectral measurement. Reference numeral 12 is an input slit which limits the intensity of the light emitted from the light source 10. Reference numeral 14 is a concave mirror which converts the incident light into a parallel beam via the input slit 12.

Reference numeral 16 is a diffraction grating, the surface thereof being formed with a plurality of grooves, and spatially separates into each wavelength the parallel light converted by the concave mirror 14. The diffraction grating 16 is disposed on a stage rotatable in the direction of the reference letter $D_1$, and rotates in the direction of the reference numeral $D_1$ along with the rotation of the stage 17. Reference numeral 18 is a concave mirror, and among the light separated spatially into each wavelength by the diffraction grating 16, only the light incident of the concave mirror 18 which converges at a the slit position of emission slit 20. Reference numeral 20 is the emission slit, and limits the wavelength band of the light which converges on the slit position by concave mirror 18.

The above-described input slit 12, concave mirror 14, diffraction grating 16, concave mirror 18, and emission slit 20 constitute a spectroscope called a Czerny-Turner scattering spectroscope.

Reference numeral 22 is a light detection device such as a photodiode, and is for converting the intensity of the light emitted from the emission slit 20 into an electrical signal. Reference numeral 24 is an amplifier which amplifies the electrical signal output from the light detection device 22. Reference numeral 26 is an analog-digital converter (below, A/D converter) which converts the amplified values from the amplifier 24 into digital signals.

In addition, the member with reference number 28 is a motor which rotates the stage 17 upon which the diffraction grating is disposed. By the rotation axle 29 of the motor 28 rotating in the direction of reference letter $D_2$, the stage 17 and the diffraction grating 16 are rotated in the direction of reference letter $D_1$. Reference numeral 30 is the motor drive circuit, and limits the rotating action of the rotation axle 29 of the motor 28 according to a control signal output from a CPU 34 described below.

Reference numeral 32 is a slit width control apparatus which changes the slit width of emission slit 20 according to a control signal output from the CPU 34 described below.

Reference numeral 36 is a display apparatus, such as a CRT (cathode ray tube), or liquid crystal. The CPU 34 is connected to the above-described A/D 26, the motor drive circuit 30, the slit width control apparatus 32, and the display apparatus 36 by the bus B, and in addition to outputting the control signal which controls the motor drive circuit 30 and the slit width control apparatus 32, processes the digital signal output from the A/D converter 26, and displays on display apparatus 36, for example, a spectral distribution.

In the above-described construction, when light is emitted from the light source 10, the emitted light is incident on the input slit 12. Light transiting the input slit 12 is converted to parallel light by the concave mirror 14, and is incident on the diffraction grating 16. The diffraction grating 16 has at its center plurality of grooves formed in the surface parallel to the axis, and is rotated by the motor 28 so as to take an arbitrary angle with respect to the parallel light. This arbitrary angle is determined by the motor drive circuit 30 controlling the motor 28 according to the control signal output from the CPU 34.

The diffraction grating 16 spatially separates at each wavelength the incident parallel light. Among the wavelengths spatially separated by the diffraction grating 16, only light of a wavelength determined by the angle between the parallel light and the diffraction grating 16 is emitted to the concave mirror 18. The concave mirror 18 converges only light of the input wavelength on the slit position of the emission slit 20. In addition, only wavelength components which are within the range of the slit width of the emission slit 20 transit the emission slit 20. The slit width control apparatus 32 receives commands from the CPU 34 and sets the width of the emission slit 20.

The light detection device 22 receives the light transiting the emission slit 20, and converts it into an electric signal in proportion to the optical intensity of the transiting light. The amplifier 24 amplifies the output of the light detection device to a voltage appropriate for input into the A/D converter 26. The A/D converter 26 converts the output of the amplifier 24 into a digital signal. The digital signal output from the A/D converter 26 is input into the CPU 34, and numerically processed in the CPU 34. CPU 34 outputs the result of the numerical processing (for example, the spectral distribution) to the display apparatus via a bus B. The display apparatus 36 displays the display content according to the calculation results output from the CPU 34.

Next the measurement sequence will be explained. First, CPU 34 outputs a control signal to the slit width control apparatus 32, and sets the width of the emission slit 20. Next, the CPU 34 sends a command to the motor drive circuit 30, setting the wavelength to transit the emission slit 20 by changing the angle of the diffraction grating, and takes in the optical intensity of the transiting light of emission slit 20 from the output of the A/S converter 26. The CPU 34 outputs the control signal to the motor drive circuit 30, and sweeps the wavelengths transiting the emission slit 20 from a starting measurement wavelength to a ending measurement wavelength. The measurement wavelength optical intensity characteristics obtained over several trials is displayed in the display apparatus 36 as an optical spectrum.

The transiting wavelength bandwidth RB (also called the wavelength resolution) of the spectrograph 5 of the Czerny-Turner scattering type shown in FIG. 5 can be expressed by the following formula where the focal distance of the concave mirror 14 and the focal distance of the concave mirror 18 are equal, and that the width of emission slit 20 is wider than the input slit 12.

EQ 1 (1)

$$RB = \frac{2d}{m \cdot f} \cdot S \cdot \cos\beta$$

Here, d is the interval between the grooves formed on the diffraction grating 16, m is the diffraction degree of the diffraction grating 16, f is the focal distance of convex mirrors 14 and 18, S is the slit width of the emission slit 20, β is the angle between the direction of the emitted light towards the convex mirror 18 and the line normal to the diffraction grating 4 among the diffracted light of the diffraction grating 16.

In the optical spectrum measuring apparatus, it is necessary to appropriately set the wavelength bandwidth of the spectrometer 5 when measuring in conjunction with the type of the light source. According to the above equation 1, in order to vary the wavelength bandwidth RB of the spectrometer 5, the slit width of emission slit 20 is mechanically controlled by the slit width control apparatus 32. Because of this, the construction becomes complicated, and the adjustment difficult.

Figure 6:
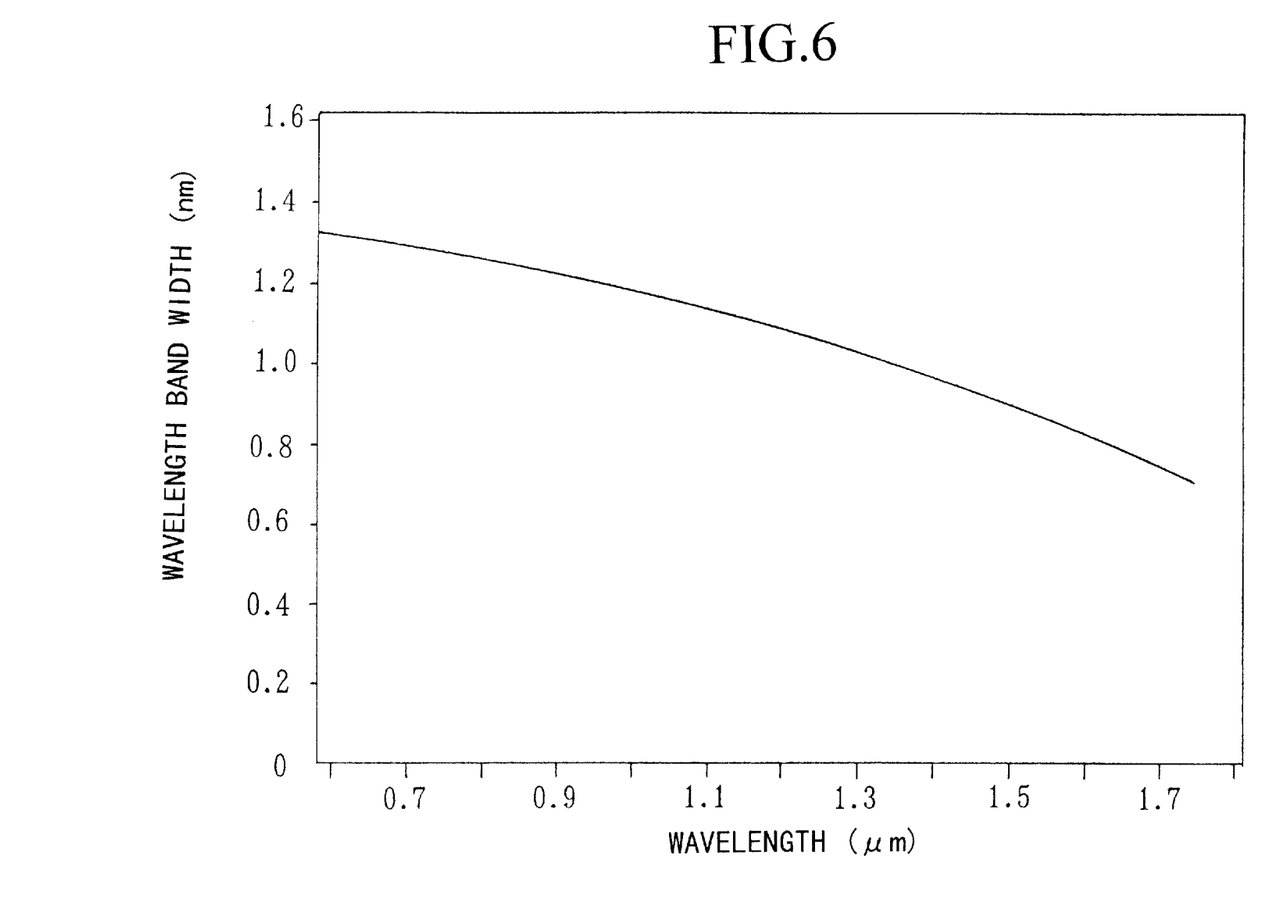
FIG. 6 shows an example of the wavelength bandwidth of the spectrometer 5 shown in FIG. 5.

In addition, when varying the measurement wavelength, the diffraction grating 16 must be rotated in the direction of the reference letter $D_1$, and if the angle with respect to the parallel light of the diffracting grating 16 is changed, according to equation 1, the wavelength bandwidth of the spectrometer 5 will change depending on the measurement wavelength. Due to this, the characteristics of the wavelength bandwidth of the spectrometer 5 become as shown, for example, in FIG. 6. FIG. 6 shows an example of the wavelength bandwidth characteristics of the spectrometer 5 shown in FIG. 5.

Because the measured light of the optical spectrum is generally broader than the wavelength bandwidth of the spectrometer 5, when the spectrometer 5 has the characteristics of the wavelength bandwidth shown in FIG. 6, the measured optical spectrum will come to be characterized in the short wavelengths becoming elevated, and the problem arises that an optical spectrum cannot be correctly obtained.

In the above-described technology, this problem could not be solved because the measured wavelength vs. optical intensity characteristics as such made the optical spectrum.

Below, the optical spectrum calculation method according to the embodiments of the present invention will be explained in detail with reference to the figures.

First, before explaining each embodiment, the meaning of the signs and terms used in the following explanation is defined, and then the optical spectrum measurement apparatus which applies the embodiments of the present invention will be explained.

First, a "measurement point" refers to each scattered measurement point when the optical intensity which changes the wavelength is measured. Each measurement point has a number attached, which is denoted m. Again, a single wavelength corresponds to one measurement point, and this wavelength is denoted λ (m), and the optical intensity obtained at this measurement point is denoted P (m).

For example, when the wavelength range of 600 nm to 700 nm is measured at 0.1 nm intervals, λ (1)=600.0, λ (2)=600.1, λ (3)=600.2, ..., λ (1001)=700.0. Additionally, P (m) denotes the measured optical intensity in wavelength λ (m). When the optical spectrum is diagramed as an XY graph, the abscissa is λ (m) and the ordinate is P (m).

Figure 1:
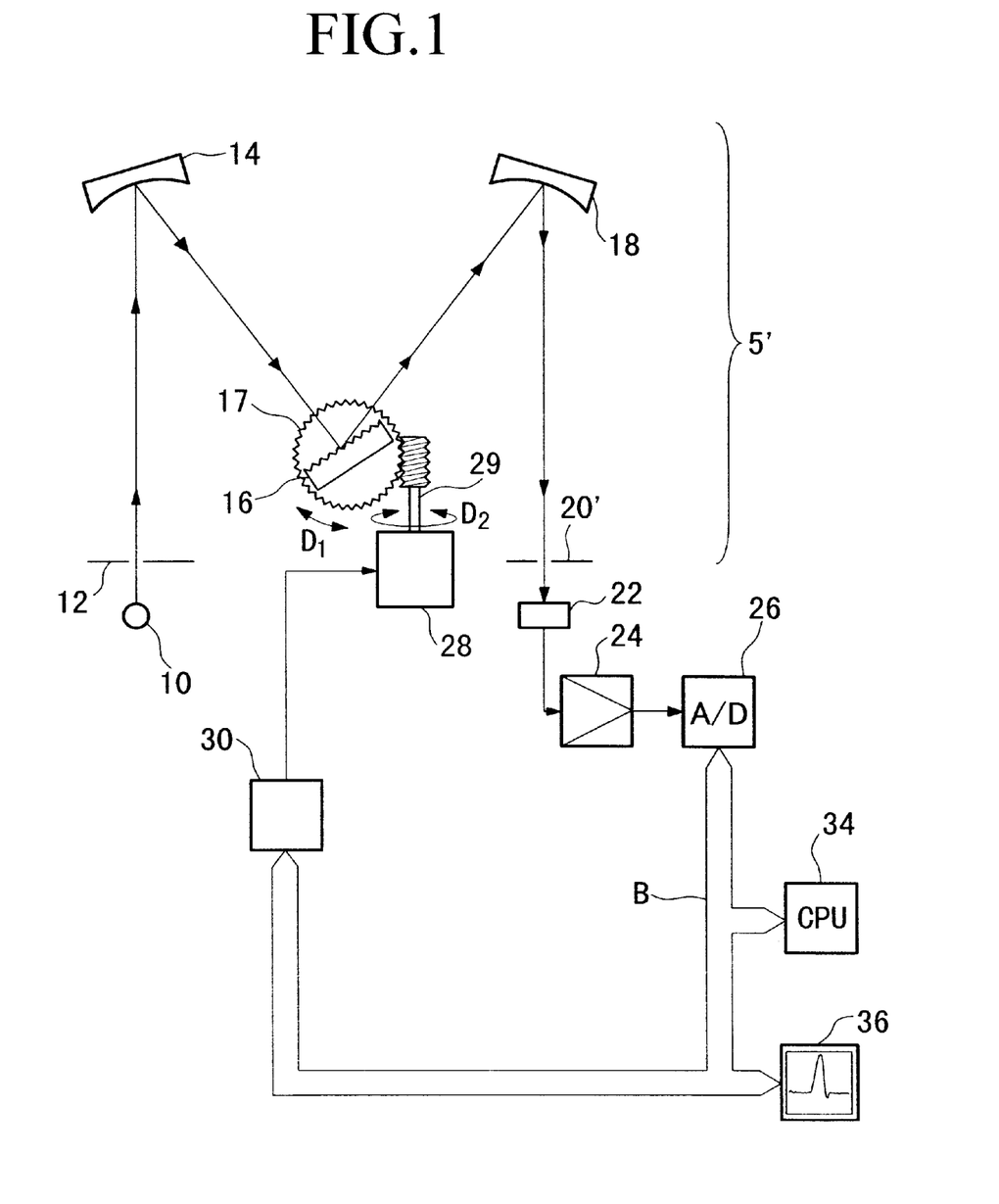
FIG. 1 is a block diagram showing the construction of an optical spectrum measurement apparatus which applies the optical spectrum calculation method of the embodiments of the present invention.

FIG. 1 is a block diagram showing the structure of the optical spectrum measurement apparatus applying the optical spectrum calculation method of the present embodiment. The optical spectrum measurement apparatus shown in FIG. 1 differs from the optical spectrum measurement apparatus shown in FIG. 5 in that the slit width control apparatus 32 shown in FIG. 5 is eliminated, and it is provided with a spectrometer wherein the emission slit 20 is changed to emission slit 20'. The emission slit 20' is a slit with a fixed slit width, and does not change like that of emission slit 20.

In the above-described construction, when optical spectrum measurement is carried out, light emitted from optical source 10 transits the emission slit 12, is transformed into parallel light by the concave mirror 14, and is incident on the diffraction grating 16. The incident light is spatially separated, and only the wavelength determined by the angle, etc., of the incident light and the diffraction grating is diffracted in the direction of the concave mirror 18, and converges on the slit of emission slit 20' due to concave mirror 18.

In addition, only the wavelength components determined by the slit width of emission slit 20' transit emission slit 20', and are incident on the optical detection device. The incident light is converted into an electrical signal in proportion to the optical intensity by the optical detection device 22, and the light emitted from the optical detection device 22 is amplified to an appropriate voltage for input into the A/D converter 26. The A/D converter 26 is amplified by the amplifier 24, and converted into a digital signal by the A/D converter.

When the CPU 34 completes the measurement of the optical intensity for the light of a certain wavelength, it outputs a control signal to the motor drive circuit 30, rotates the motor 28, and changes the angle of the light emitted from the convex mirror 14 and the diffraction grating 16. When this angle changes, the wavelength of the light output from the emission slit 20' is changed by, for example, 0.1 nm. The CPU 34, after outputting the above control signal, in the same manner as the above-described operation, calculates the input digital signal. In this manner, the CPU 34 measures the wavelength range of 1573 nm~1580 nm at 0.1 nm intervals, for example, and calculates and finds the optical intensity of each wavelength.

Figure 2:
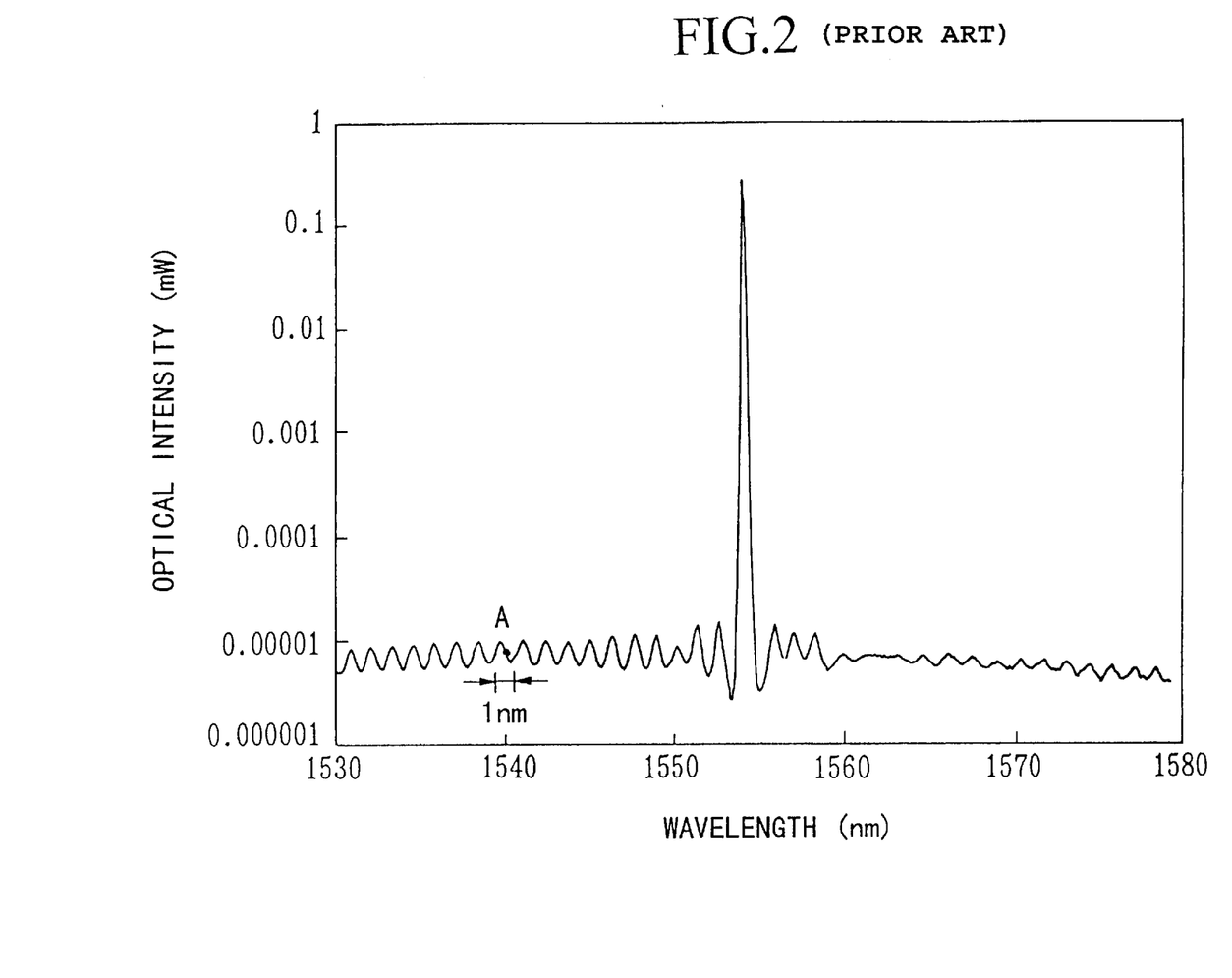
FIG. 2 shows an example of the optical spectrum obtained when the optical spectrum calculation method of the embodiments of the present invention is not applied.

An example of an optical spectrum obtained in this manner is shown in FIG. 2. FIG. 2 shows an example of the optical spectrum of a DFB laser obtained when the optical spectrum calculation method is not applied. As is diagramed here, in this example the waveform having a peak light intensity at about 1554 nm is obtained, an in the wavelength region of 1530 nm~1553 nm and in the wavelength region of 1555 nm~1580 nm, a waveform in which the optical intensity oscillates at around 0.00001 mW is obtained.

Below, the optical spectrum calculation method according to the embodiments of the present invention are explained in detail.

First Embodiment

First, the case will be explained wherein the wavelength interval when measuring the optical spectrum is S, the wavelength interval of the measurement point m is equal to the wavelength bandwidth, and the wavelength bandwidth of the spectrometer 5' can be considered a fixed wavelength bandwidth.

First, the interval of the measured wavelength is set to the wavelength interval S, and as described above, the intensity of the light is measured over the measured wavelength bandwidth. This measurement operation is entirely the same as the above-described operation.

When the measurement completes, an arbitrary wavelength bandwidth R is set, and this wavelength bandwidth R can be arbitrarily set by an operator, for example, to 1 nm. When this wavelength bandwidth R is set, the optical intensity P' in each measurement point m when the wavelength band of the spectrometer 5' is considered to be wavelength bandwidth R is found according to equation 2.

$$EQ\ 2 \qquad (2)$$

$$P'(m) = \sum_{i=m-N}^{m+N} P(i)$$

where N=R/(2×S).

According to the above equation 2, the optical intensity P' (m) is understood to have been obtained from a summation over the range of the wavelength bandwidth R. That is, the optical intensity P' (m) obtained from equation 2 is obtained by setting the wavelength region determined by an arbitrarily set wavelength region R and interval S of the measurement points m on the long wavelength side and the short wavelength side of the measurement point m, and taking into consideration the their influence on the optical spectrum included in this wavelength region. Therefore, using equation 2, it is possible to convert the actually measured optical spectrum into the optical spectrum of the wavelength bandwidth R.

In the present embodiment, if the wavelength interval S of the measurement points m when observing the optical spectrum by the spectrometer 5' is made equal to the wavelength bandwidth considered as the wavelength bandwidth of the spectrometer 5', it is possible to obtain a correct optical intensity.

Moreover, in the above equation 2, when N is not an integer, the fractional part is truncated, and because the range of the summation becomes narrow with respect to the wavelength bandwidth R, error is incurred. This case, as is equation 3, can be compensated by considering the wavelength region outside the wavelength bandwidth R.

$$EQ\ 3 \qquad (3)$$

$$P'(m) = \sum_{i=m-Na}^{m+Na} P(i) + Nb \cdot [P(m - Na - 1) + P(m + Na + 1)]$$

where Na is the integer part of N, and Nb is the fractional part of N.

Second Embodiment

In the second embodiment, we explain an optical spectrum calculation method which correctly finds the optical spectrum for an arbitrarily set wavelength bandwidth R, even in the case that the measured wavelength interval S is narrower than the wavelength bandwidth Rt which is considered to be the wavelength bandwidth of the spectrometer 5'.

Moreover, the optical spectrum measurement method applying the optical spectrum calculation method of the present embodiment is the identical to the optical spectrum measurement method shown in FIG. 1.

First, the measured wavelength is set to the wavelength interval S, and as described above, the intensity of the light is measured over the measured wavelength bandwidth. This measurement operation is entirely identical to the operation described above.

When the measurement is completed, an arbitrary wavelength bandwidth R is set, and this wavelength bandwidth R can be set arbitrarily by the operator, for example, to 0.1 nm. When this wavelength bandwidth R is set, the optical intensity P' at each measurement point m when the wavelength bandwidth of the spectrometer 5' is considered to be the wavelength bandwidth R is found by the following equation 4.

$$EQ\ 4 \qquad (4)$$

$$P'(m) = \sum_{i=m-N}^{m+N} [P(i)] \cdot \frac{S}{Rt}$$

where N=R/(2×S).

According to the above equation 4, the optical intensity P' continuously adds the optical intensity P (m) of each measurement point P (m) over the range of the wavelength bandwidth R, and furthermore, compensates error by measuring with a wavelengths interval S which is more narrow than the wavelength bandwidth R. That is, as in the first embodiment, the wavelength band R which is arbitrarily set and the wavelength region which is determined by the interval S of the measurement points m are set in the long wavelength side and the short wavelength side of the measurement points m, and the optical intensity is obtained taking into account the influence on the optical spectrum included in these wavelength regions. Additionally, for the obtained optical intensities, in order to compensate the error by measurement using a wavelength interval S which is more narrow than the wavelength bandwidth Rt, the value, the values of the measured interval S divided by the wavelength bandwidth Rt are multiplied. Therefore, it is possible to convert the optical spectrum measured by wavelength bandwidth Rt to the optical spectrum where the wavelength bandwidth is R.

Figure 3:
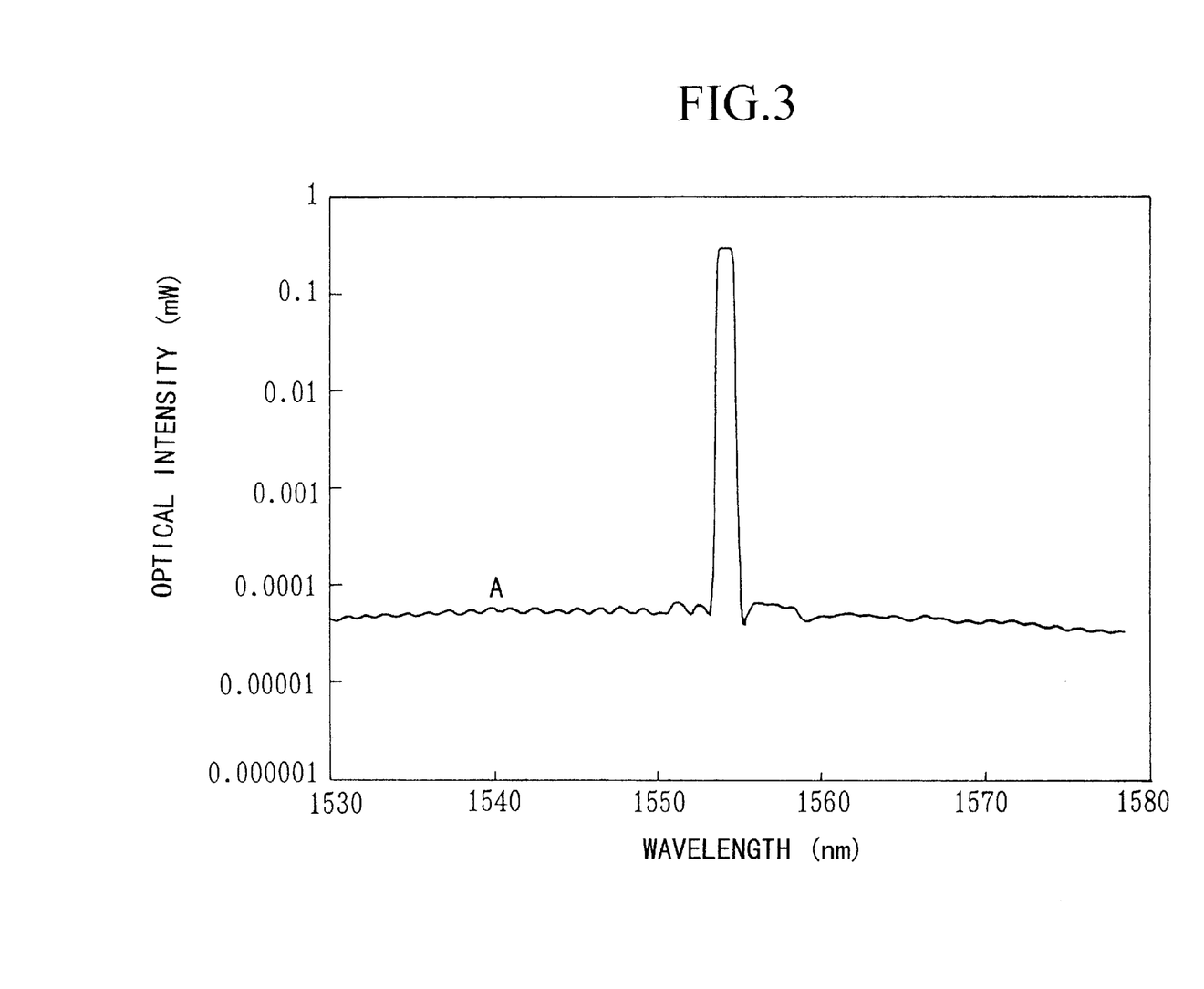
FIG. 3. is the optical spectrum obtained when the second embodiment of the present invention is applied to the optical spectrum shown in FIG. 2.

FIG. 3 is an optical spectrum obtained when the second embodiment of the present invention is applied to the optical spectrum shown in FIG. 2. In FIG. 3, the optical intensity of each measurement point m of the optical spectrum shown in FIG. 2 is summed over the range of the wavelength bandwidth 1 nm by equation 4, and compensated. For example, the data of measurement point A in FIG. 3 is obtained with compensation by adding over the range of the wavelength band 1 nm, with the measurement point A of FIG. 2 in the center.

Moreover, in the case that N is not an integral number, the fractional part is truncated, and because the range of the summation becomes narrow with respect to the wavelength bandwidth R, error is incurred. This case can be compensated by taking into account the wavelength band outside the wavelength bandwidth R.

$$P'(m) = \sum_{i=m-Na}^{m+Na} [P(i)] \cdot \frac{S}{Rt} + Nb \cdot [P(m-Na-1) + P(m+Na+1)] \cdot \frac{S}{Rt} \quad (5)$$

where Na is the integer part of N, and Nb is the fractional part of N.

Third Embodiment

The third embodiment explains the case wherein the wavelength interval measured in the same manner as in the second embodiment is smaller than the wavelength bandwidth of the spectrometer 5', and furthermore, the wavelength bandwidth of the spectrometer 5' is not a fixed wavelength bandwidth Rt, but takes into account the changes depending on the measured wavelength.

In the present embodiment, the wavelength region of the spectrometer 5' is not considered to be a fixed wavelength bandwidth Rt, but taking into consideration that when the wavelength changes, the wavelength band changes too, the wavelength band of spectrometer 5' is RB, and the wavelength band of each measurement point m is expressed as RB (i).

Figure 4:
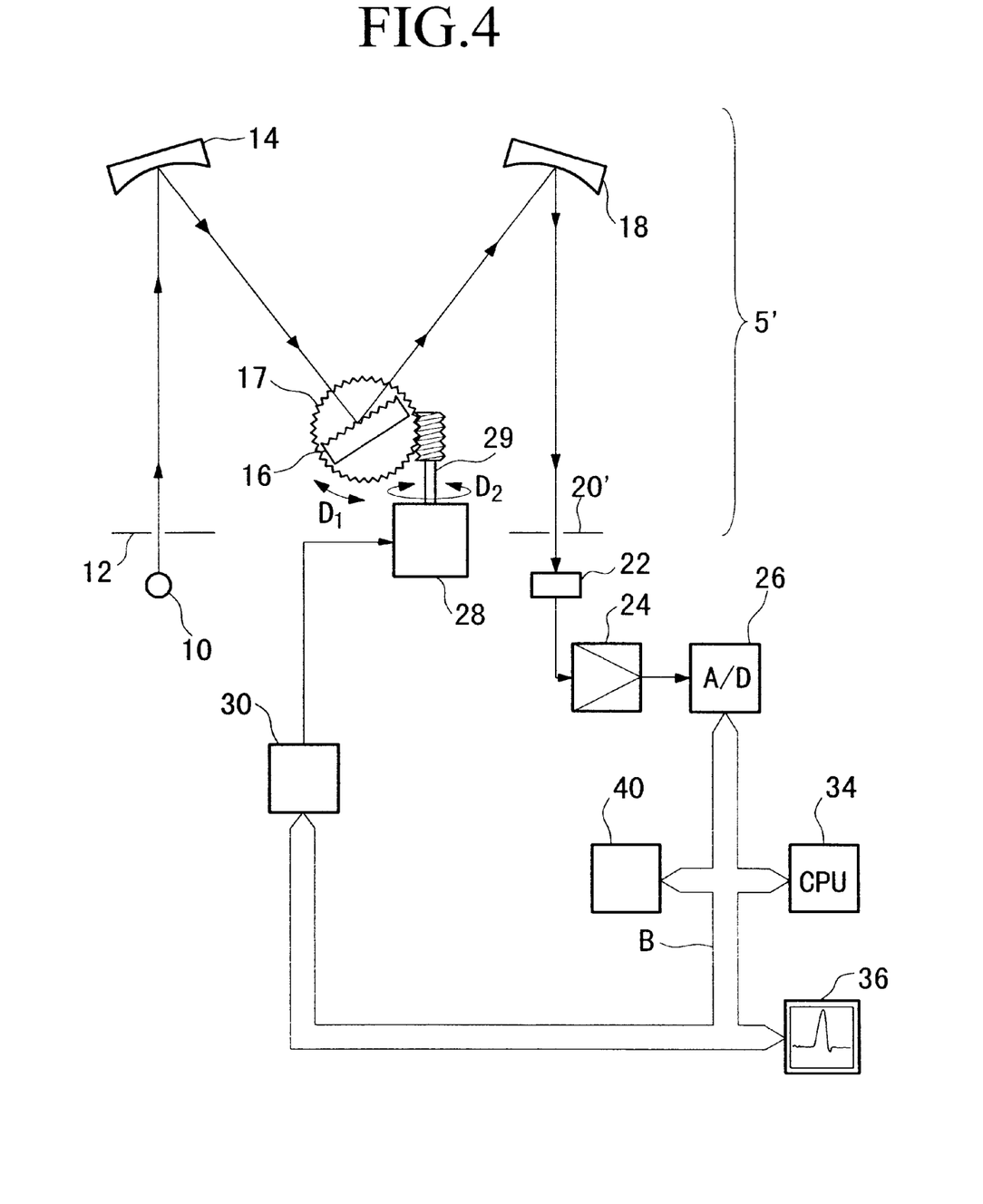
FIG. 4. is a block diagram showing the construction of an optical spectrum measurement apparatus applying the optical spectrum calculation method of the third embodiment of the present invention.

First, the optical spectrum measurement device wherein the present embodiment is applied is explained. FIG. 4 is a block diagram showing the construction of the optical spectrum measurement apparatus applying the optical spectrum calculation method of the third embodiment of the present invention. The optical spectrum measurement apparatus wherein the third embodiment of the present invention shown in FIG. 4 is applied differs from the optical spectrum measurement apparatus wherein the first embodiment or second embodiment shown in FIG. 1 is applied in that a wavelength bandwidth memory unit 40 is connected with a bus B.

The wavelength bandwidth memory unit 40 records the characteristics of the transiting wavelength bandwidth for the measured wavelengths of spectrum 5'. For example, the wavelength bandwidth for 350 nm~1750 nm is recorded for every 10 nm. This value records beforehand the values found by actual measurement or by calculation.

First, the interval of the measured wavelength is set to wavelength interval S, and as described above, when the measurement is completed, an arbitrary wavelength bandwidth R is set, and this wavelength bandwidth R can be set arbitrarily by the operator to, for example, 1 nm.

When the measurement completes, first based on the wavelength bandwidth stored in the wavelength bandwidth memory unit 40 the wavelength bandwidth RM (m) for each measurement point m is found. When the wavelength corresponding the measurement point m is not recorded, RB (m) is found by a method such as linear interpolation based on the recorded closest transiting bandwidth of the wavelength.

Next, the optical intensity P' (m) for the wavelength bandwidth R is found for each measurement point m by equation 6.

$$P'(m) = \sum_{i=m-N}^{m+N} \left[ P(i) \cdot \frac{S}{RB(i)} \right] \quad (6)$$

where N=R/(2×S).

According to the above equation 6, the optical intensity P' (m) compensates error by summing the optical intensity P (m) of each measurement point m over the range of the wavelength band R, and then measuring the wavelength bandwidth RB (m) which differs from the measurement point m. Therefore, the data of the measurement of the wavelength bandwidth RB (m) can be converted to the optical spectrum of the wavelength bandwidth R.

Moreover, when N is not an integer, the fractional part is truncated, and because the range of the summation becomes narrow with respect to the wavelength bandwidth R, error is incurred. This case can be compensated taking into consideration the wavelength bandwidth outside the wavelength bandwidth R, as in equation 7:

$$P'(m) = \sum_{i=m-Na}^{m+Na} \left[ P(i) \cdot \frac{S}{RB(i)} \right] + Nb \cdot P(m-Na-1) \cdot \frac{S}{RB(m-Na-1)} + Nb \cdot P(m+Na+1) \cdot \frac{S}{RB(m+Na+1)} \quad (7)$$

where Na is the integer part of N, and Nb is the fractional part of N.

Above, we have explained the embodiments of the present invention, but in each embodiment described above, a construction wherein the light from the light source 10 is emitted to the spectrometer via an optical fiber is also possible. In this case, because the output terminal of the optical fiber plays the role of the input slit 12, the input slit 12 can be eliminated.

In addition, a construction wherein an one mirror serves as the concave mirror 14 and the concave mirror 18 is also possible. Mirror 14 and mirror 18 can also be replaced by a lens. Furthermore, the present invention can also be applied to a two-stage spectrometer such as that disclosed in Japanese Patent Application, First Publication, Number 6-22192.

Finally, in each of the above-described embodiments, the case was explained wherein the slit width control apparatus 32 shown in FIG. 5 was eliminated, but even in the case that the slit width control apparatus 32 such as that shown in FIG. 5 is present, each of the embodiments of the present invention can be applied. Even in this case, by the present embodiments, it is possible to calculate the optical spectrum for a wavelength bandwidth which differs from the wavelength bandwidth obtained by the slit width which can be set by the slit width control apparatus 32.

What is claimed is:

1. An optical spectrum calculation method comprising:
    setting a measurement interval and a predetermined wavelength bandwidth of measurement points at which the optical intensity of an optical spectrum is measured;
    measuring the optical intensity of light input at each of said measurement points by a spectrometer;
    setting a wavelength region determined by said measurement interval and said wavelength bandwidth on a shorter wavelength and longer wavelength side of the measurement points; and
    obtaining the optical intensity for each of said measurement points by summing the optical intensities over a relevant wavelength region for the measured optical intensity.

2. An optical spectrum calculation method according to claim 1 further comprising:
    compensating the optical intensity when the shortest wavelength component and longest wavelength component of said wavelength region are between said measurement point and another measurement point, according to:
        the optical intensity of the measurement point closest to a relevant shortest wavelength component and the degree of closeness to the measurement point to which the shortest wavelength component is closest at the shortest wavelength component and outside said wavelength region, and
        the optical intensity of the measurement point closest to a relevant longest wavelength component and the degree of closeness to the measurement point to which the longest wavelength component is closest at the longest wavelength component and outside said wavelength region.

3. An optical spectrum calculation method comprising:
    setting a measurement interval and predetermined wavelength bandwidth of measurement points at which the optical intensity of an optical spectrum is measured;
    measuring the optical intensity of light input at each of said set measurement points by a spectrometer;
    setting a wavelength region determined by said measurement interval and said wavelength bandwidth at a short wavelength and a long wavelength for each of said measurement points;
    obtaining the optical intensity value of each of said measurement points by adding the optical intensities over the relevant wavelength region for the measured optical intensities; and
    obtaining the optical intensity value of each measurement point by compensating the optical intensity of each of said measurement points based on the ratio of the wavelength bandwidth and said wavelength interval wherein the wavelength bandwidth of said spectrometer is treated as constant.

4. An optical spectrum calculation method according to claim 3 further comprising:
    compensating said optical intensity values when the shortest wavelength component and the longest wavelength component of said wavelength region are between said measurement point and another measurement point according to:
        the optical intensity of the measurement point closest to a relevant shortest wavelength component, the degree of closeness to the measurement point to which the shortest wavelength component is closest at the shortest wavelength component and outside said wavelength region, and a ratio between the wavelength bandwidth and said wavelength interval when the wavelength bandwidth of said spectrometer is treated as constant, and
        the optical intensity of the measurement point closest to a relevant longest wavelength component, the degree of closeness to the measurement point to which the longest wavelength component is closest at the longest wavelength component and outside said wavelength region, and the ration between the wavelength bandwidth and said wavelength interval when the wavelength bandwidth of said spectrometer is treated as constant.

5. An optical spectrum calculating method further comprising:
    setting a wavelength bandwidth of a spectrometer corresponding to the measurement wavelength;
    setting a measurement interval of measurement points at which the optical intensity of an optical spectrum is measured;
    measuring the optical intensity of light input for each of said set measurement points by said spectrometer;
    obtaining a wavelength bandwidth of said spectrometer for each of said measurement points of the optical spectrum from said set wavelength bandwidth;
    determining a wavelength region by said measurement interval and said wavelength bandwidth for short wavelengths and long wavelengths;
    obtaining the optical intensity of each of said measurement points by adding the optical intensities over a relevant wavelength region for the measured optical intensities; and
    obtaining optical intensity values of each measurement point by compensating the optical intensities of each of said points based on the ratio of said wavelength bandwidth and said wavelength interval.

6. An optical spectrum calculation method according to claim 5 further comprising:
    compensating said optical intensity value when the shortest wavelength component and the longest wavelength component of said wavelength region are between said measurement point and another measurement point according to:
        the optical intensity of the measurement point closest to a relevant shortest wavelength component and the degree of closeness to the measurement point to which the shortest wavelength component is closest at the shortest wavelength component and outside said wavelength region, and ration between the wavelength bandwidth and said wavelength interval when the wavelength bandwidth of said spectrometer is treated as constant, and
        the optical intensity of the measurement point closest to a relevant longest wavelength component and the degree of closeness to the measurement point to which the longest wavelength component is closest at the longest wavelength component and outside said wavelength region, and the ratio between the wavelength bandwidth and said wavelength interval when the wavelength bandwidth of said spectrometer is treated as constant.

* * * * *